June 6, 1944. R. J. STEWART 2,350,479
ARTICLE TIMING DEVICE
Original Filed Aug. 16, 1938 3 Sheets-Sheet 1
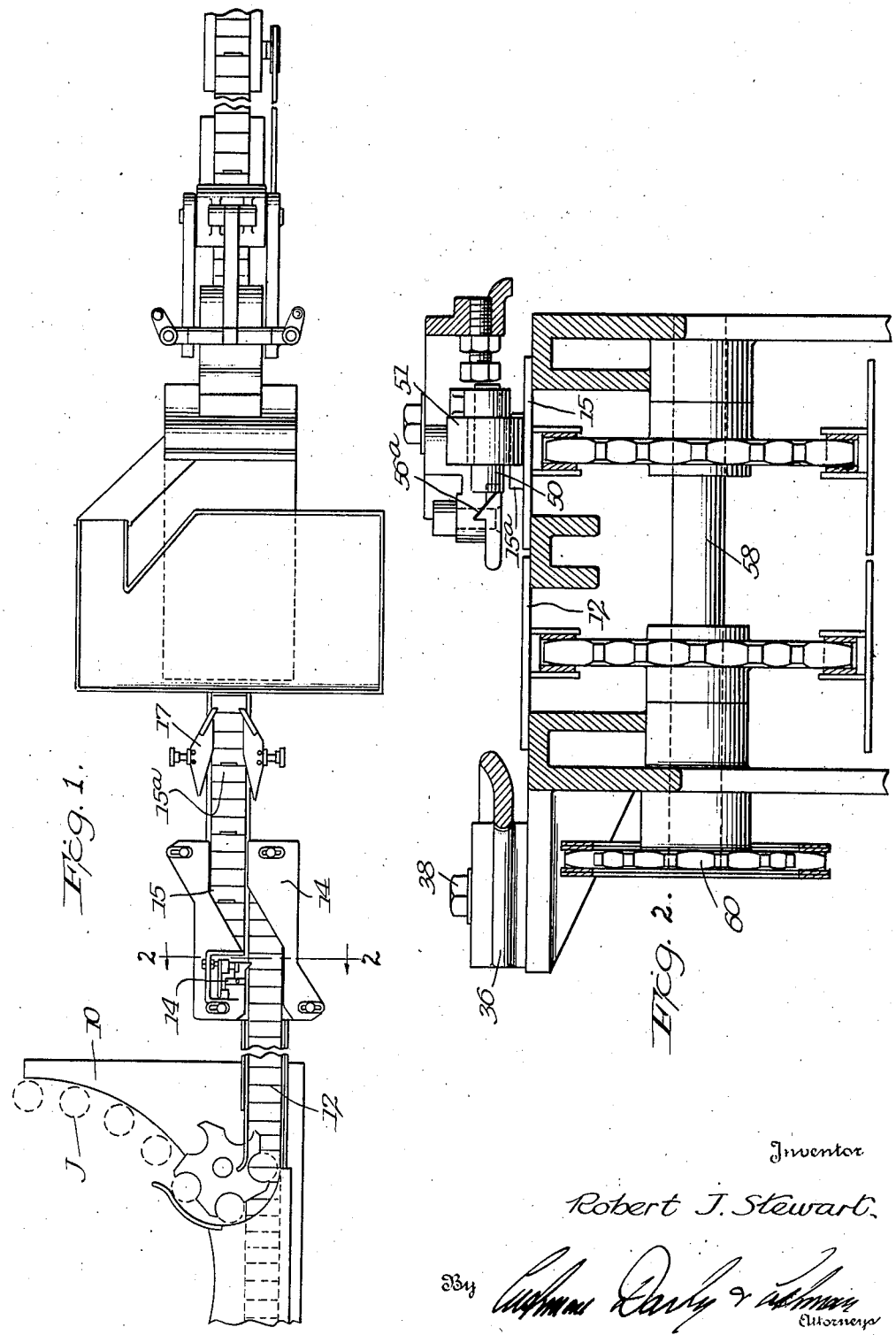
Inventor
Robert J. Stewart
By
Attorneys

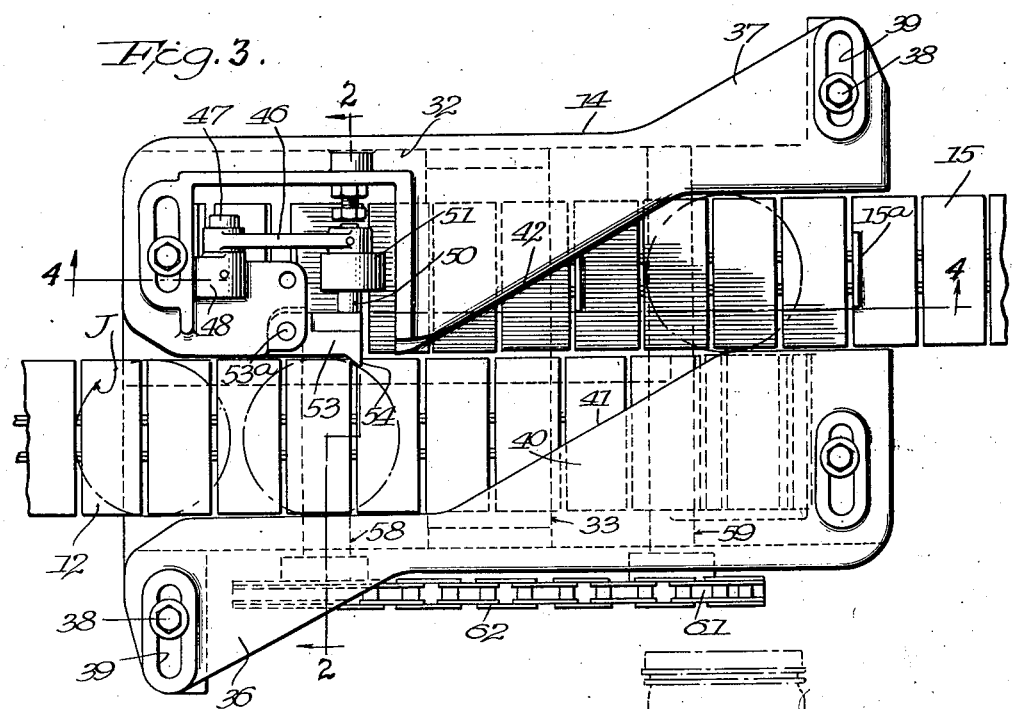

June 6, 1944. R. J. STEWART 2,350,479
ARTICLE TIMING DEVICE
Original Filed Aug. 16, 1938 3 Sheets-Sheet 3
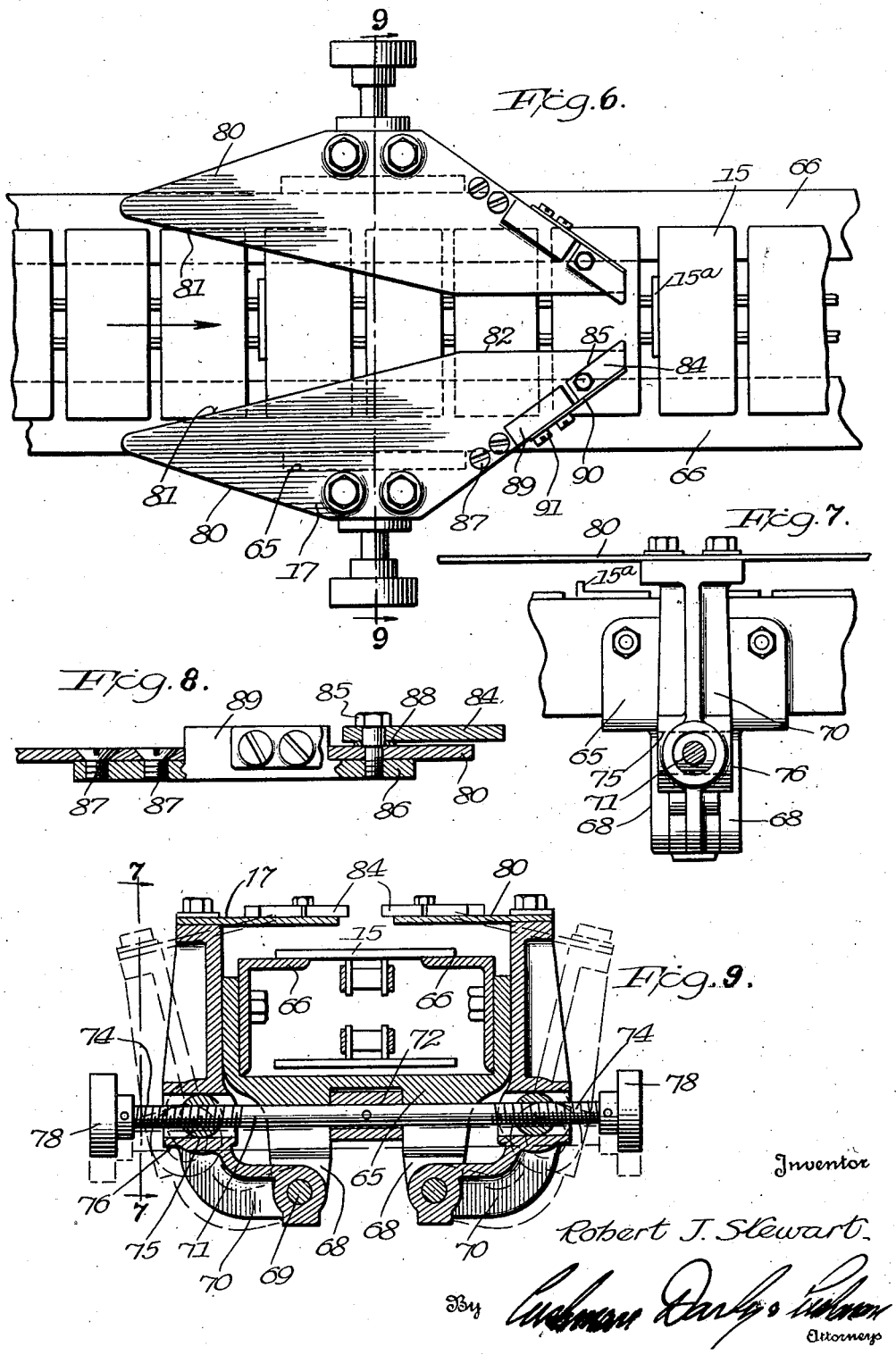
Inventor
Robert J. Stewart
By Cushman Darby Cushman
Attorneys Patented June 6, 1944

2,350,479

UNITED STATES PATENT OFFICE 2,350,479

ARTICLE TIMING DEVICE

Robert J. Stewart, Baltimore, Md., assignor to Crown Cork & Seal Company, Inc., Baltimore, Md., a corporation of New York Original application August 16, 1938, Serial No. 225,230. Divided and this application January 29, 1942, Serial No. 428,797

4 Claims. (Cl. 198—34)

The present invention relates to an article timing device for use with conveyors, and is a division of my application for Apparatus for sealing containers, Serial No. 225,230, filed August 16, 1938, and issued as Patent No. 2,311,707, February 23, 1943.

An important object of the invention is the provision of a means to transfer containers or other articles from one conveyor to another and in properly timed relation.

Still another object of the invention is the provision of a mechanism to center articles upon a conveyor and also to insure that articles will be positioned in properly spaced relation upon a conveyor.

A further object of the invention is to provide devices of the type referred to above which will cooperate to place containers or other articles in properly spaced relation upon a moving conveyor.

Other objects and advantages of the invention will be apparent from the following drawings, wherein:

Figure 1 is a plan view of a container sealing apparatus provided with the mechanism of the present invention.

Figure 2 is a detail view on the lines 2—2 of Figures 1 and 3 and showing a transfer and gate mechanism which may be used with the invention.

Figure 3 shows the mechanism of Figure 2 in plan.

Figure 4 is a detail vertical sectional view on the line 4—4 of Figure 3.

Figure 5 is a perspective view of a gate member used in the mechanisms of Figures 3 and 4.

Figure 6 is a plan view of a container spacing and centering mechanism.

Figure 7 shows a detail of the spacing mechanism, the view being taken on the line 7—7 of Figure 9.

Figure 8 is a detail view, partly in side elevation and partly in vertical section, of one of the blades of the spacing mechanism, and Figure 9 is a transverse vertical sectional view on the line 9—9 of Figure 6.

Referring to Figure 1, which shows the mechanism of the present invention positioned adjacent a container filling machine 10, containers or jars indicated by the letter J which have been filled upon the filling machine 10 leave the filling machine by movement about an outfeed spider of usual construction and provided with circumferentially spaced pockets, the spider positioning the containers upon an endless straight line conveyor 12.

Containers J moving along the conveyor 12 move to the gate and transfer mechanism 14 which serves to insure that the containers will be positioned upon the straight line container supporting conveyor 15 in spaced relation.

After being positioned upon the conveyor 15, the containers move through a centering mechanism 17 which exerts a slight drag upon the containers, and insures that each container will be positioned directly in advance of one of a plurality of lugs 15a which are spaced at regular intervals along the supporting conveyor 15. The lugs 15a are so spaced with respect to each other and the conveyor 15 is so timed with respect to the operation of the mechanism to which the containers are moved, for example a capping mechanism such as disclosed in said original application, that on each descent of the capping head, a lug 15a will present a container directly beneath the capping head. When containers of small sizes are run through the apparatus, the mechanism 17 may also be used to insure that such containers will be centered upon the longitudinal center-line of the conveyor.

Referring to Figure 1, the transfer and gate mechanism 14 surrounds and partially overlies the outer or right hand end of a straight line conveyor 12 leading from a filling machine 10, and the left hand or inlet end of a straight line conveyor 15 which moves containers through an apparatus such as disclosed in said original application. The transfer mechanism 14 includes a base plate 30 carried on the upright posts 31. Plate 30 is provided with openings 32 and 33 and the upper run of conveyor 12 moves over one side of the base plate and down through the opening 33, while the upper run of conveyor 15 moves upwardly through opening 32 and along the other side of the base plate.

Guide plates 36 and 37 are adjustably secured to the base plate by means of bolts 38 extending through slots 39 in the plates. Plate 36 extends along the outer edge of conveyor 12 and includes a portion 40 having an inclined edge 41, portion 40 overlying the right hand end of conveyor 12, and the inclined edge 41 serving to guide containers J from the outfeed end of conveyor 12 toward the conveyor 15. The guide plate 37 is of a form generally complementary to the opposite edge of plate 40 and includes an inclined edge 42 along which containers J will move when directed toward conveyor 15 by plate 36. It will be observed that the arrangement of the plates 36 and 37 with respect to each other is such that a container J moving in a straight line along conveyor 12 will have its direction of movement slightly varied, and without jarring action, so that it will be positioned upon the conveyor 15.

The guide plate 37 supports a gate or timing device which serves to insure that containers will be positioned upon the conveyor 15 at properly spaced intervals. The timing device is mounted in a cut-out 45 in the infeed end of plate 37 and includes a link 46 pivoted at one end upon a pin 47 fixed in a lug 48 extending into the cut-out as shown in Figures 3 and 4. At its free end, the link 46 has a cam pin 50 fixed thereto, the pin 50 extending toward conveyor 12. Pin 50 carries a roller 51 rotatable on the pin, roller 51 being adapted to bear, by its own weight, upon the upper surface of the conveyor 15. Conveyor 15 is provided with spaced upstanding lugs 15a and as a lug 15a moves beneath the roller 51, the latter will be lifted. A latch or gate element 53 is pivoted upon the plate 37 on a vertical pivot pin 53a, gate 53 including a beveled shoulder 54 which normally projects into the path of travel of containers J on the conveyor 12 because, in such normal position, the adjacent end of cam pin 50 is in contact with a vertical face 55 of the rear wall of latch 53 as shown in Figure 5. Hence, the movement of containers past the gate 53 will be momentarily prevented, and the movement of the leading container J on conveyor 12 will be stopped as shown in Figure 3 when this container comes in contact with the shoulder 54 of stop 53. When a lug 15a of conveyor 15 moves beneath the roller 51 of the gate device, the roller 51 and link 46 will be swung upwardly, thereby raising the cam pin 50, bringing the same opposite an inclined portion 56 on the upper rear surface of gate 53. Gate 53 will thus be free to swing backwardly by the pressure of a container against the same and the shoulder 54 will be moved from the path of the leading container on conveyor 12 so that the container will be moved forward by the conveyor 12 past the gate and onto conveyor 15. Immediately the lug 15a has moved from beneath the roller 51, the cam pin 50 will drop and will come into contact with the vertical surface 55 of the retracted gate element, and the weight of the roller and link will force the gate outwardly to its normal position in time to contact with the next succeeding container J. As indicated in Figure 3, the release of the gate 53 is so timed that a container will be moved upon the conveyor 15 to a point substantially midway between two lugs 15a of the latter conveyor, thereby assuring that an advancing lug 15a to the rear of the container will not interfere with the movement of the container upon the conveyor 15.

The conveyors 12 and 15 and their adjacent shafts 58 and 59 are respectively provided with sprockets 60 and 61 connected by a sprocket chain 62, thus insuring that the two conveyors will operate at the same speed and in properly timed relation. The conveyors are preferably driven from the motor of the present apparatus.

The position of the centering and drag mechanism 17 with respect to the transfer mechanism is shown in Figure 1 and the mechanism is illustrated in detail in Figures 6 to 9. As best shown in Figure 9, this mechanism comprises a substantially U-shaped bracket 65 secured to the angled bars 66 along which the conveyor 15 moves. As will be noted in Figures 6 and 9, the angled bars 66 have the horizontal portions thereof extending beneath the edges of the links of the conveyor 15 so as to support the upper run of the conveyor. The lower portion of bracket 65 has a pair of spaced lugs 68 projecting downwardly from each side thereof and each pair of lugs supports a pivot pin 69 between the same. An angled lever 70 has its lower and inner end journalled on each pin 69 so that a pivotally mounted angled lever 70 is thus provided at each side of the conveyor 15. The levers 70 are held upwardly alongside the conveyor 15 by means of a rod 71 extending beneath the bracket 65, rod 71 being positioned to extend between each pair of lugs 68. A collar 72 is pinned to the rod 71 between the two pairs of lugs 68 so that longitudinal movement of the rod will be prevented and rod 71 has its opposite ends oppositely threaded as indicated at 74 with the threaded portions respectively extending through pins 76 journalled in pockets 75 in the levers 70. By this arrangement, rotation of the rod 71 by means of knobs 78 provided at each end thereof will cause the levers 70 to be drawn inwardly against the sides of the brackets 65, or the levers may be moved outwardly toward the dotted line position of Figure 9, the levers being respectively maintained at equal distances from the longitudinal center-line of the upper run of conveyor 15.

Each lever 70 has a plate 80 secured to its upper end, each plate being arranged to extend in a horizontal plane and parallel to the upper surface of the conveyor 15 when the levers 70 are in their innermost position. As shown in Figure 6, each plate 80 has the portion of its inner edge 81 with which containers will first contact inclined inwardly toward the center of the conveyor 15 so that containers abutting with these edges of the plates will be longitudinally centered with respect to the conveyor. The next adjacent edge portion 82 of the plates extends parallel with the longitudinal center-line of the conveyor so that containers will be held centered with respect to the conveyor while passing between these portions of the plates.

As best shown in Figures 6 and 8, drag fingers 84 are mounted at the outlet portion of the plates 80, the fingers 84 being pivoted upon the plates and held in the inward position indicated in Figure 6 by resilient means. In the embodiment of the mechanism disclosed herein, each finger 84 is pivoted upon its plate 80 by means of a shouldered stud screw 85 (Figure 8) which extends through the plate 80 and is threaded in a lower plate 86 secured to the plate 80 by means of machine screws 87. A washer 88 may be provided beneath the finger 84 and the plate 80. The lower plate 86 includes an upwardly extending ear 89 fitted in a cut-out in the plate 80 and ear 89 has one end of a leaf spring 90 secured thereto as by screws 91 so that the free end of the leaf spring 90 bears upon the outer face of the finger 84. By this arrangement, each finger 84 will normally be held in the position indicated in Figure 6 but may swing outwardly or rearwardly upon the pivot 85 against the action of the leaf spring 90. The tension exerted by the leaf springs 90 is sufficient to cause movement of a container to be momentarily prevented while the conveyor 15 moves beneath the container until the following lug 15a on the conveyor contacts with the lower and rearward portion of the container. Contact of the lug 15a with the container will cause the container to be drawn through and past the fingers 84.

Adjustment of the position of the plates 80 of the centering and retarding mechanism 17 will enable small sized containers to be centered upon the conveyor 15.

It will be observed that the mechanism of Figures 2 to 5 and the mechanism of Figures 6 to 9 cooperate to place a container or other article in a desired position upon a receiving conveyor and, more particularly, place the container in contact with a container engaging device on the receiving conveyor. Thus, articles moving at random on one conveyor may be properly spaced and, if desired, exactly positioned upon a receiving conveyor.

While the invention has been described as used for handling containers, its use with other articles will be apparent.

The phraseology used in the specification is for the purpose of description and is not intended to limit the invention, the scope of the invention being indicated in the claims.

I claim:

1. In combination, a delivery conveyor, a continuously moving receiving conveyor, means to move said latter conveyor, said receiving conveyor having article engaging members spaced along and moving with the same, means operated by said article engaging members to control movement of articles from the delivery conveyor to the receiving conveyor and to place articles on the latter conveyor intermediate of and out of contact with said article engaging members, and resilient means associated with the receiving conveyor to retard the movement of articles moving therewith so that an article will be held against movement with the receiving conveyor until the article is in engagement with an article engaging member.

2. In combination, a pair of conveyors, a latch movable into a position to extend over the path of one of said conveyors, the other of said conveyors having upwardly projecting trip members spaced along the same, and a vertically movable arm arranged in the path of movement of said trip members, said arm being weighted to normally contact with said latch to hold the latter over the path of said first conveyor.

3. In combination, a delivery conveyor, a receiving conveyor, means to drive said conveyors, said conveyors having portions thereof arranged side-by-side, means to guide an article from the delivery conveyor to the receiving conveyor, a latch movable into a position to extend over the delivery conveyor to prevent the movement of articles therewith and toward said guide means, a vertically movable arm extending above said receiving conveyor and normally bearing on the latter, said arm being mounted to contact with said latch in said normal position to hold the latter in a position to extend over the delivery conveyor, and a plurality of trips spaced along said receiving conveyor and adapted to lift said arm from said latch so that articles may move past said latch toward said guide means.

4. In combination, a delivery conveyor, a receiving conveyor, means to drive said conveyors, said conveyors having portions thereof arranged side-by-side, means to guide an article from the delivery conveyor to the receiving conveyor, a latch movable into a position to extend over the delivery conveyor to prevent the movement of articles therewith and toward said guide means, a vertically movable arm extending above said receiving conveyor and normally bearing on the latter, said arm being mounted to contact with said latch in said normal position to hold the latter in a position to extend over the delivery conveyor, and article engaging members spaced along said receiving conveyor and adapted to lift said arm from said latch so that articles may move past said latch toward said guide means, and resiliently mounted means associated with said receiving conveyor to engage each article and hold it against movement with said receiving conveyor until the article is in contact with an article engaging member.

ROBERT J. STEWART.